(12) United States Patent
Han et al.

(10) Patent No.: US 9,130,246 B2
(45) Date of Patent: Sep. 8, 2015

(54) RECHARGEABLE LITHIUM BATTERY HAVING LITHIUM DIFLUOROPHOSPHATE AND A SULTONE-BASED COMPOUND

(75) Inventors: Su-Hee Han, Yongin-si (KR); Young-Gyu Kim, Geumjeong-gu (KR); Byung-Hwa Kim, Geumjeong-gu (KR)

(73) Assignees: Samsung SDI Co., Ltd., Yongin-si (KR); Panax Etec Co., Ltd., Busan (KR)

( * ) Notice: Subject to any disclaimer, the term of this patent is extended or adjusted under 35 U.S.C. 154(b) by 229 days.

(21) Appl. No.: 13/586,831

(22) Filed: Aug. 15, 2012

(65) Prior Publication Data

US 2013/0177818 A1 Jul. 11, 2013

Related U.S. Application Data

(60) Provisional application No. 61/585,549, filed on Jan. 11, 2012.

(51) Int. Cl.
*H01M 10/056* (2010.01)
*H01M 10/0567* (2010.01)
*H01M 10/052* (2010.01)
*H01M 10/0568* (2010.01)
*H01M 4/525* (2010.01)
*H01M 4/02* (2006.01)

(52) U.S. Cl.
CPC ........ *H01M 10/0567* (2013.01); *H01M 10/052* (2013.01); *H01M 10/056* (2013.01); *H01M 10/0568* (2013.01); *H01M 4/525* (2013.01); *H01M 2004/021* (2013.01); *H01M 2300/0025* (2013.01); *H01M 2300/0085* (2013.01); *Y02E 60/122* (2013.01)

(58) Field of Classification Search
CPC ............. H01M 10/05–10/0569; H01M 10/056
USPC ................... 429/188, 189, 300–347
See application file for complete search history.

(56) References Cited

U.S. PATENT DOCUMENTS

| | | | |
|---|---|---|---|
| 2001/0023041 A1* | 9/2001 | Hayase et al. | 429/303 |
| 2008/0305402 A1 | 12/2008 | Kato et al. | |
| 2009/0286155 A1 | 11/2009 | Takehara | |
| 2010/0176352 A1* | 7/2010 | Chen et al. | 252/521.2 |
| 2010/0190065 A1* | 7/2010 | Ihara et al. | 429/331 |
| 2010/0216019 A1 | 8/2010 | Morishima | |
| 2011/0091768 A1 | 4/2011 | Ohashi et al. | |

FOREIGN PATENT DOCUMENTS

| | | |
|---|---|---|
| EP | 1 905 739 A1 | 2/2008 |
| EP | 2 211 401 A2 | 7/2010 |
| EP | 2 437 340 A1 | 4/2012 |

(Continued)

OTHER PUBLICATIONS

Machine English Translation of JP 11-067270 A, 8 pages.

(Continued)

*Primary Examiner* — Jonathan G Leong
(74) *Attorney, Agent, or Firm* — Christie, Parker & Hale, LLP

(57) ABSTRACT

A rechargeable lithium battery includes a negative electrode including a negative active material, a positive electrode including a positive active material, and an electrolyte including $LiPO_2F_2$ and a sultone-based compound.

11 Claims, 1 Drawing Sheet

(56) References Cited

FOREIGN PATENT DOCUMENTS

| | | |
|---|---|---|
| EP | 2 469 638 A1 | 6/2012 |
| JP | 11-067270 A | 3/1999 |
| JP | 2008-41413 A | 2/2008 |
| JP | 2009-87934 A | 4/2009 |
| JP | 2009-99285 A | 5/2009 |
| KR | 10-2008-0018897 | 2/2008 |
| KR | 10-2009-0042979 | 5/2009 |
| WO | WO 2010/137571 A1 | 2/2010 |
| WO | WO 2011/021570 A1 | 2/2011 |
| WO | WO 2012/146525 A1 | 1/2012 |

OTHER PUBLICATIONS

English Machine Translation of Japanese Publication No. JP 2008-41413 A, 18 pages.

European Office Action dated Jan. 30, 2013 for European Application No. 12193740.3, 10 pages.

* cited by examiner

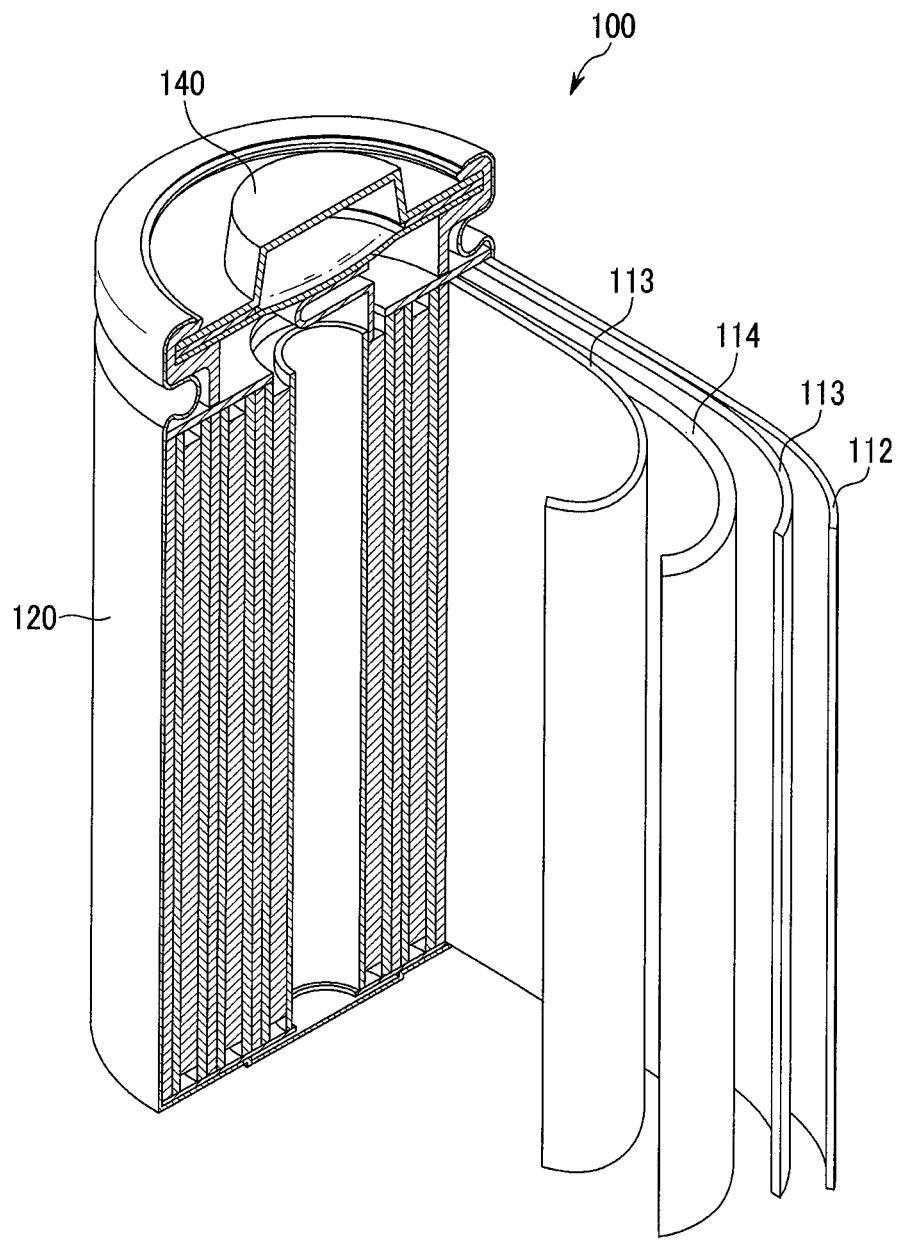

1

RECHARGEABLE LITHIUM BATTERY HAVING LITHIUM DIFLUOROPHOSPHATE AND A SULTONE-BASED COMPOUND

CROSS-REFERENCE TO RELATED APPLICATION

This application claims priority to and the benefit of U.S. Provisional Application No. 61/585,549, filed in the USPTO on Jan. 11, 2012, the contents of which are incorporated herein by reference.

BACKGROUND

1. Field

A rechargeable lithium battery is disclosed.

2. Description of the Related Art

A rechargeable lithium battery is a device that transforms chemical energy into electrical energy. Rechargeable lithium batteries have been widely used as power sources for portable electronic devices such as mobile phones, MP3 players, and the like.

In particular, polymer batteries that including a gel electrolyte may be easily fabricated to have various shapes as required for portable electronic devices having various shapes. As such, polymer batteries have been increasingly used for portable electronic devices.

Various performance improvements such as capacity, cycle-life, high temperature characteristic, and the like, are being researched in polymer batteries.

In particular, the gel electrolyte solution included in the polymer batteries have been prepared using new, various materials in order to improve performance.

SUMMARY

Aspects of embodiments of the present invention are directed to a rechargeable lithium battery having improved capacity and cycle-life characteristics and reduced swelling.

According to one embodiment, a rechargeable lithium battery includes a negative electrode including a negative active material, a positive electrode including a positive active material, and an electrolyte including $LiPO_2F_2$ and a sultone-based compound.

The electrolyte may include $LiPO_2F_2$ at 0.01 to 15 wt % based on the total weight of the electrolyte. In some embodiments, the electrolyte may include $LiPO_2F_2$ at 1 to 10 wt % based on the total weight of the electrolyte.

The electrolyte may include the sultone-based compound at 0.5 to 10 wt % based on the total weight of the electrolyte. In some embodiments, the electrolyte may include the sultone-based compound at 0.5 to 3 wt % based on the total weight of the electrolyte.

The sultone-based compound may be selected from 1,3-propene sultone, 1,3-propane sultone, or combinations thereof.

The positive electrode may have an active mass density of 3.6 to 4.0 g/cm$^3$. The positive active material may include a lithium cobalt oxide.

The electrolyte may be a gel electrolyte. The gel electrolyte may include a polymer. Prior to polymerization, the electrolyte may have a viscosity of greater than or equal to 4 cp at 25° C. In some embodiments, prior to polymerization, the electrolyte may have a viscosity of 7 to 16 cp at 25° C.

The electrolyte may further include a non-aqueous organic solvent and a lithium salt.

According to one embodiment, an electrolyte includes $LiPO_2F_2$ and a sultone-based compound.

The electrolyte may include $LiPO_2F_2$ at 0.01 to 15 wt % based on the total weight of the electrolyte. The electrolyte may include the sultone-based compound at 0.5 to 10 wt % based on the total weight of the electrolyte. The sultone-based compound may be selected from 1,3-propene sultone, 1,3-propane sultone, or combinations thereof.

The electrolyte may be a gel electrolyte. The gel electrolyte may include a polymer. Prior to polymerization, the electrolyte may have a viscosity of greater than or equal to 4 cp at 25° C.

BRIEF DESCRIPTION OF THE DRAWING

FIG. 1 is a schematic cross-sectional view of a rechargeable lithium battery according to an embodiment of the present application.

DETAILED DESCRIPTION

Exemplary embodiments will hereinafter be described in detail. However, these embodiments are exemplary, and this disclosure is not limited thereto.

A rechargeable lithium battery according to an embodiment of the present application includes a negative electrode including a negative active material; a positive electrode including a positive active material; and an electrolyte including $LiPO_2F_2$ and a sultone-based compound.

FIG. 1 is a cross-sectional schematic view showing the structure of a rechargeable lithium battery. Referring to FIG. 1, the rechargeable lithium battery 100 includes a negative electrode 112, a positive electrode 114, a separator 113 interposed between the negative electrode 112 and the positive electrode 114, an electrolyte (not shown) impregnating the negative electrode 112, positive electrode 114, and separator 113, a battery case 120, and a sealing member 140 sealing the battery case 120. The rechargeable lithium battery 100 is fabricated by sequentially laminating the negative electrode 112, and the separator 113, and the positive electrode 114, spirally winding them, housing the spiral-wound product in the battery case 120, and sealing the battery case 120 with the sealing member 140.

The electrolyte includes $LiPO_2F_2$ and a sultone-based compound (e.g., both materials are included simultaneously). The inclusion of both materials may improve the cycle-life characteristics of the battery and further, may improve high temperature cycle-life characteristics by, e.g., suppressing swelling. It is believed that an uncharged region in lithium polymer batteries results from the reduced electrode wettability when using gel polymer electrolytes and the difficulty in forming an initial solid electrolyte interface layer on the electrodes. However, according to embodiments of the invention, when the electrolyte includes $LiPO_2F_2$ and a sultone-based compound, the amount of uncharged region is reduced. While not being bound by this theory, it is believed that the inclusion of $LiPO_2F_2$ and a sultone-based compound may aid in forming the solid electrolyte interface layer on the electrodes.

The electrolyte may include $LiPO_2F_2$ in an amount ranging from about 0.01 to about 15 wt % based on the total weight of the electrolyte. In some embodiments, the electrolyte may include $LiPO_2F_2$ at 1 to about 10 wt % based on the total weight of the electrolyte. In embodiments of the present invention, electrolyte that includes $LiPO_2F_2$ within the above referenced range reduces the amount of an uncharged region and also improves the capacity of a rechargeable lithium battery.

Suitable sultone-based compounds include at least one of 1,3-propene sultone, 1,3-propane sultone, and the like.

The electrolyte may include the sultone-based compound in an amount ranging from about 0.5 to about 10 wt % based on the total weight of the electrolyte. In some embodiments, the electrolyte may include the sultone-based compound at 0.5 to 3 wt % based on the total weight of the electrolyte. In embodiments of the invention, when the electrolyte includes the sultone-based compound, as well as $LiPO_2F_2$, within the above described range, the amount of the uncharged region is reduced and thus, the capacity of the rechargeable lithium battery is improved.

The electrolyte further includes a non-aqueous organic solvent and a lithium salt. The non-aqueous organic solvent transmits ions taking part in the electrochemical reaction of a battery.

Suitable non-aqueous organic solvents include at least one of a carbonate-based solvent, an ester-based solvent, an ether-based solvent, a ketone-based solvent, an alcohol-based solvent, and an aprotic solvent. Suitable carbonate-based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Suitable ester-based solvents include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. Suitable ether-based solvents include dibutyl ether, tetraglyme, diglyme, dimethoxyethane, 2-methyltetrahydrofuran, tetrahydrofuran, and the like. Suitable ketone-based solvents include cyclohexanone and the like. Suitable alcohol-based solvents include ethanol, isopropyl alcohol, and the like. Suitable aprotic solvents include nitriles such as R—CN (wherein R is a C2 to C20 linear, branched, or cyclic hydrocarbon group, that may include a double bond, an aromatic ring, or an ether bond); amides such as dimethylformamide or dimethylacetamide; dioxolanes such as 1,3-dioxolane; sulfolanes; and the like.

A single non-aqueous organic solvent may be used, or mixtures of organic solvents may be used. When mixtures of organic solvents are used, the mixture ratio can be controlled in accordance with desirable performance of a battery.

The carbonate-based solvent may include a mixture of a cyclic carbonate and a linear carbonate. In some embodiments, the cyclic carbonate and the linear carbonate are mixed together in a volume ratio of about 1:1 to about 1:9. An electrolyte including a cyclic carbonate and a linear carbonate mixed in the above ratios may have improved performance.

The electrolyte may be prepared by further adding the aromatic hydrocarbon-based solvent to the carbonate-based solvent. In embodiments of the present invention, the carbonate-based solvent and the aromatic hydrocarbon-based solvent are mixed together in a volume ratio of about 1:1 to about 30:1.

The aromatic hydrocarbon-based organic solvent may be an aromatic hydrocarbon-based compound represented by the following Chemical Formula 2.

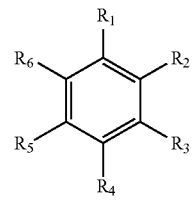

[Chemical Formula 2]

In Chemical Formula 2, $R_1$ to $R_6$ are each independently hydrogen, halogen, a C1 to C10 alkyl group, a C1 to C10 haloalkyl group.

Suitable aromatic hydrocarbon-based organic solvents include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include vinylene carbonate or an ethylene carbonate-based compound represented by the following Chemical Formula 3 in order to improve the cycle-life of a battery.

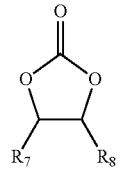

[Chemical Formula 3]

In Chemical Formula 3, $R_7$ and $R_8$ are each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

The lithium salt is dissolved in the non-aqueous solvent and supplies lithium ions in the rechargeable lithium battery and thus, provides a basic component to allow the rechargeable lithium battery to operate and improves lithium ion transfer between the positive and negative electrodes. Suitable lithium salts include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato) borate, LiBOB), and a combination thereof. The lithium salt may be a supporting electrolytic salt. The lithium salt may be used in a concentration of 0.1 to 2.0 M. In embodiments of the present invention, when the lithium salt is included within the above concentration range, the electrolyte has good electrolyte conductivity and viscosity and thus, improved performance and lithium ion mobility.

According to one embodiment, the electrolyte is a gel electrolyte. The gel electrolyte may have viscosity, prior to polymerization, of greater than or equal to about 4 cp at 25° C. In some embodiments, the gel electrolyte has a viscosity, prior to polymerization, of 7 to 16 cp at 25° C.

In general, gel electrolytes have a greater swelling problem at high temperatures due to high viscosity. The greater swelling problems may deteriorate cycle-life and increase over time and furthermore, may reduce the capacity of the lithium battery. According to embodiments of the invention, the electrolyte includes $LiPO_2F_2$ and a sultone-based compound as additives and thus, swelling may be reduced or suppressed, thereby improving improve cycle-life. In addition, the amount of uncharged region is reduced thereby increasing the formation capacity.

For example, the electrolyte may be a gel polymer electrolyte including a polymer. This gel polymer electrolyte may be prepared by curing a composition for a polymer electrolyte (i.e., a polymer electrolyte precursor). The composition for a polymer electrolyte includes a gel polymer-forming monomer and a gel-forming compound. Suitable gel polymer-forming monomers include ethylene glycol, diethylene glycol, trimethylol propane, acrylate, methacrylate, and the like. Suitable gel-forming compounds include polyethyleneoxide (PEO), polypropyleneoxide (PPO), polyacrylonitrile (PAN), polyvinylidenefluoride (PVDF), polymethacrylate (PMA), polymethylmethacrylate (PMMA), and combinations thereof. For example, the gel-forming compound may be poly(ester)(meth)acrylate prepared by substituting a part or all of three-OH groups of polyester polyol with a (meth) acrylic acid ester and substituting a group with no radical reactivity for the unsubstituted, non-reacted —OH groups.

Examples of the gel polymer electrolyte include polyethyleneglycoldimethacrylate (PEGDMA), polyethyleneglycolacrylate, and the like. The gel polymer electrolyte is prepared by radically polymerizing the gel polymer-forming monomer through heating and appropriately selecting kinds and concentrations of the gel-forming compound.

In order to prepare the gel polymer electrolyte from the aforementioned monomers, a polymerization initiator such as an organic peroxide, an azo-based compound, or a mixture thereof, may be used.

Suitable organic peroxides include diacyl peroxides such as diacetyl peroxide, dibenzoyl peroxide, dilauroyl peroxide, bis-3,5,5-trimethyl hexanoyl peroxide, or the like; peroxy dicarbonates such as di(4-t-butylcyclohexyl) peroxy dicarbonate, di-2-ethylhexyl peroxy dicarbonate, di-isopropyl peroxy dicarbonate, di-3-methoxybutyl peroxy dicarbonate, t-butyl peroxy-isopropyl carbonate, t-butylperoxy-2-ethylhexyl carbonate, 1,6-bis(t-butyl peroxycarbonyloxy)hexane, diethyleneglycol-bis(t-butyl peroxy carbonate), or the like; and peroxyesters such as t-butyl peroxy pivalate, t-amyl peroxy pivalate, t-butyl peroxy-2-ethyl-hexanoate, t-hexyl peroxy pivalate, t-butyl peroxy neoheptanoate, t-hexyl peroxy pivalate, 1,1,3,3-tetramethylbutyl peroxy neodecarbonate, 1,1,3,3-tetramethylbutyl 2-ethylhexanoate, t-amylperoxy 2-ethylhexanoate, t-butyl peroxy isobutyrate, t-amylperoxy 3,5,5-trimethyl hexanoyl, t-butyl peroxy 3,5,5-trimethylhexanoate, t-butyl peroxy acetate, t-butyl peroxy benzoate, dibutylperoxy trimethyl adipate, or the like.

The composition for forming the polymer electrolyte (i.e., the electrolyte prior to polymerization) may have viscosity of about greater than or equal to 4 cp at 25° C. In some embodiments, prior to polymerization, the electrolyte has a viscosity of about 7 cp to about 16 cp at 25° C.

The negative electrode includes a current collector and a negative active material layer formed on the current collector. The negative active material layer includes a negative active material.

The negative active material includes a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions may be a carbon material. The carbon material may be any carbon-based negative active material generally used in a lithium ion rechargeable battery. Examples of the carbon material include crystalline carbon, amorphous carbon, and mixtures thereof. The crystalline carbon may be non-shaped, or sheet, flake, spherical, or fiber-shaped natural graphite or artificial graphite. The amorphous carbon may be a soft carbon, a hard carbon, a mesophase pitch carbonized product, fired coke, or the like.

Examples of the lithium metal alloy include an alloy of lithium and at least one metal selected from Na, K, Rb, Cs, Fr, Be, Mg, Ca, Sr, Si, Sb, Pb, In, Zn, Ba, Ra, Ge, Al, or Sn.

Suitable materials capable of doping and dedoping lithium include Si, $SiO_x$ ($0<x<2$), a Si—C composite, a Si-Q alloy (wherein Q is not Si and is an element selected from alkali metals, alkaline-earth metals, group 13 elements, group 14 elements, group 16 elements, transition elements, rare earth elements, or a combination thereof), Sn, $SnO_2$, a Sn—C composite, a Sn—R alloy (wherein R is not Sn and is an element selected from alkali metals, alkaline-earth metals, group 13 elements, group 14 elements, group 15 elements, group 16 elements, transition elements, rare earth elements, or a combination thereof), and the like. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Suitable transition metal oxides include vanadium oxide, lithium vanadium oxide, and the like.

The negative active material layer also includes a binder and optionally a conductive material.

The binder improves the binding properties of the positive active material particles to one another and to the current collector. Suitable binders include at least one of polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, however, any suitable binder may be used.

The conductive material is included to improve electrode conductivity. Any electrically conductive material may be used as a conductive material, unless it causes a chemical change in the lithium battery. Examples of the conductive material include carbon-based materials such as natural graphite, artificial graphite, carbon black, acetylene black, Ketjen black, carbon fibers, or the like; a metal-based material such as a metal powder or a metal fiber including copper, nickel, aluminum, silver, or the like; a conductive polymer such as a polyphenylene derivative or the like; or mixtures thereof.

The current collector may be selected from a copper film, a nickel film, a stainless steel film, a titanium film, a nickel foam, a copper foam, a polymer substrate coated with a conductive metal, or a combination thereof.

The positive electrode may include a current collector and a positive active material layer disposed on the current collector.

The positive active material includes lithiated intercalation compounds that reversibly intercalate and deintercalate lithium ions. The positive active material may include a composite oxide including lithium and at least one of cobalt, manganese, or nickel. The positive may be one or more of the compounds represented by the following chemical formulas:

$Li_aA_{1-b}R_bD_2$ (wherein $0.90 \leq a \leq 1.8$ and $0 \leq b \leq 0.5$); $Li_aE_{1-b}R_bO_{2-c}D_c$ (wherein $0.90 \leq a \leq 1.8$, $0 \leq b \leq 0.5$, and $0 \leq c \leq 0.05$); $LiE_{2-b}R_bO_{4-c}D_c$ (wherein $0 \leq b \leq 0.5$ and $0 \leq c \leq 0.05$); $Li_aNi_{1-b-c}Co_bR_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bR_cO_{2-\alpha}Z_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Co_bR_cO_{2-\alpha}Z_2$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bR_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bR_cO_{2-\alpha}Z_\alpha$ (wherein $0.90 \leq a \leq 1.8$, $0 \leq b \leq 0.5$, $0 \leq c \leq 0.05$, and $0 \leq \alpha \leq 2$); $Li_aNi_{1-b-c}Mn_bR_cO_{2-\alpha}Z_2$ (wherein $0.90 \leq a \leq 1.8$, $0 \leq b \leq 0.5$, $0 \leq c \leq 0.05$, and $0 \leq \alpha \leq 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$.

In the above Chemical Formulas, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may be a compound coated with a coating layer or a mixture of the active material and a compound coated with a coating layer. The coating layer may include at least one coating element compound selected from an oxide of a coating element, a hydroxide of a coating element, an oxyhydroxide of a coating element, an oxycarbonate of a coating element, or a hydroxycarbonate of a coating element. The compound for the coating layer may be either amorphous or crystalline. The coating element included in the coating layer may be selected from Mg, Al, Co, K, Na, Ca, Si, Ti, V, Sn, Ge, Ga, B, As, Zr, or a mixture thereof. The coating process may include any conventional processes unless it affects the properties of the positive active material (e.g., spray coating or immersing may be used).

The positive active material layer further includes a binder and optionally a conductive material.

The binder improves binding properties of the positive active material particles to one another and to the current collector. Suitable binders include at least one of polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidenefluoride, polyethylene, polypropylene, styrene-butadiene rubber, acrylated styrene-butadiene rubber, an epoxy resin, nylon, and the like, however, any suitable binder may be used.

The conductive material is included to improve electrode conductivity. Any electrically conductive material may be used as a conductive material, unless it causes a chemical change in the lithium battery. Examples of conductive materials include carbon-based materials such as natural graphite, artificial graphite, carbon black, acetylene black, Ketjen black, carbon fibers, or the like; a metal-based material such as a metal powder or a metal fiber including copper, nickel, aluminum, silver, or the like; a conductive polymer such as a polyphenylene derivative or the like; or mixtures thereof.

In some embodiments, the positive electrode has an active mass density of 3.6 to 4.0 g/cm$^3$. When lithium cobalt oxide is used as the positive active material and is included in a positive active material layer with high active mass density (e.g., 3.6 to 4.0 g/cm$^3$), the positive active material layer may have significant swelling at high temperatures. However, in embodiments of the present invention, an electrolyte including the aforementioned $LiPO_2F_2$ and sultone-based compound may effectively reduce or suppress the swelling problem. For example, when the positive electrode includes lithium cobalt oxide and has an active mass density of from about 3.6 to about 4.0 g/cm$^3$, significant swelling at high temperatures is present. However, when an electrolyte including the aforementioned $LiPO_2F_2$ and sultone-based compound is used, swelling at high temperatures may be reduced.

The current collector may be Al but it is not limited thereto.

The negative and positive electrodes may be individually fabricated by preparing an active material composition by mixing the active material, the conductive material, and the binder and coating the composition on the current collector. A solvent such as N-methylpyrrolidone or the like may be used, however, any suitable solvent may be used.

The separator 113 separates the negative electrode 112 and the positive electrode 114 and may be any separator generally used in a lithium battery. The separator may have low resistance against ion movement and good moisturizing capability for the electrolyte solution. For example, the separator may be made of materials selected from glass fiber, polyester, TEFLON (tetrafluoroethylene), polyethylene, polypropylene, polytetrafluoroethylene (PTFE), or a combination thereof. The separator may be a non-woven fabric or a cloth. For example, a lithium ion battery may include a polyolefin-based polymer separator such as polyethylene, polypropylene, or the like. In some embodiments, the separator may be a separator coated with a ceramic component or a polymer material to provide heat resistance or mechanical strength. In some embodiments, the separator may be a single layer, while in other embodiments, multi-layer separators may be used.

A rechargeable lithium battery may have a shape such as a cylinder, a prism, a coin, a pouch, or the like and may be classified as a bulk-type or a thin film type battery. Generally, pouch-type rechargeable lithium batteries have a greater swelling problem, but the swelling problem may be significantly improved by using an electrolyte including the aforementioned $LiPO_2F_2$ and sultone-based compound.

The rechargeable lithium battery is fabricated by inserting an electrode assembly, including the positive and negative electrodes, in a battery case, injecting a polymer electrolyte precursor in the case, and curing the polymer electrolyte precursor. In the curing process, monomers included in the polymer electrolyte precursor are polymerized into a polymer by a polymerization initiator. Accordingly, a polymer-type electrolyte is included in the battery. The battery case may be a metal can or a metal-laminated pouch.

The following examples illustrate the present invention in more detail. These examples, however, should not in any sense be interpreted as limiting the scope of the present invention.

Examples 1 to 13 and Comparative Examples 1 to 4

Electrode assemblies were fabricated using lithium cobalt oxide ($LiCoO_2$) as a positive active material, graphite as a negative active material, and a film separator made of polyethylene (PE) interposed therebetween. The electrode assemblies were placed in a pouch. Then, a polymer electrolyte precursor was injected into the pouch and cured to form a gel polymer electrolyte, completing fabrication of a pouch-type rechargeable lithium battery cell. The polymer electrolyte precursor was prepared by mixing 1.25 wt % hexylacrylate (HA) (wt % relative to total mass of electrolyte solution); 3.75 wt % of a gel polymer-forming monomer mixture including ethylene glycol (EG), diethylene glycol (DEG), and trimethylol propane (TMP) (wt % relative to total mass of electrolyte solution); and 400 ppm of an azo based compound as a polymerization initiator. The remainder of the precursor included a solution including ethylene carbonate, ethylmethyl carbonate, and dimethyl carbonate in a volume ratio of 1:1:1, with 1 M $LiPF_6$ dissolved therein. $LiPO_2F_2$ and/or 1,3-propene sultone were also added so as to have the composition in Table 1.

The viscosity of the polymer electrolyte precursor, the active mass density of the positive active material layer, and the amounts of the $LiPO_2F_2$ and/or 1,3-propene sultone are shown in Table 1.

TABLE 1

| | Viscosity of electrolyte precursor solution [cp @ 25° C.] | Active mass density of positive active material layer [g/cm³] | Amount of $LiPO_2F_2$ [wt % relative to total mass of electrolyte solution] | Amount of 1,3-propene sultone [wt % relative to total mass of electrolyte solution] |
|---|---|---|---|---|
| Example 1 | 7 cp | 3.80 | 0.1 | 0.5 |
| Example 2 | 7 cp | 3.80 | 1 | 5 |
| Example 3 | 7 cp | 3.80 | 1 | 10 |
| Example 4 | 7 cp | 3.80 | 0.5 | 1 |
| Example 5 | 7 cp | 3.80 | 1 | 1 |
| Example 6 | 7 cp | 3.80 | 2 | 1 |
| Example 7 | 7 cp | 3.80 | 10 | 1 |
| Example 8 | 7 cp | 3.80 | 15 | 1 |
| Example 9 | 7 cp | 3.80 | 1 | 11 |
| Example 10 | 4 cp | 3.80 | 1 | 1 |
| Example 11 | 7 cp | 3.65 | 1 | 1 |
| Example 12 | 7 cp | 3.58 | 1 | 1 |
| Example 13 | 7 cp | 3.80 | 16 | 3 |
| Comparative Example 1 | 7 cp | 3.80 | 2 | 0 |
| Comparative Example 2 | 7 cp | 3.80 | 0 | 1 |
| Comparative Example 3 | 7 cp | 3.80 | 3 | 0 |
| Comparative Example 4 | 7 cp | 3.80 | 0 | 2 |

Experimental Example 1

Capacity Characteristic Evaluation

The rechargeable lithium battery cells according to Examples 1 to 13 and Comparative Examples 1 to 4 were charged and discharged with 0.5 C at 25° C. and measured to determine their discharge capacity at the first cycle. The results are provided in the following Table 2.

Experimental Example 2

Cycle-Life Evaluation

The rechargeable lithium battery cells according to Examples 1 to 13 and Comparative Examples 1 to 4 were charged and discharged at 1 C for 300 cycles. The capacity ratio at the $300^{th}$ cycle relative to the first cycle was calculated according to the following Equation 1, and the results are provided in the following Table 2.

$$\text{Cycle-life capacity retention}(\%) = (\text{cycle-life capacity}(@300^{th}\text{ cycle})/\text{cycle-life capacity}(@1^{st}\text{ cycle})) *100 \quad [\text{Equation 1}]$$

Experimental Example 3

Cycle-Life Evaluation at 45° C.

The rechargeable lithium battery cells according to Examples 1 to 13 and Comparative Examples 1 to 4 were charged and discharged at 1 C for 300 cycles. The capacity ratio at the $300^{th}$ cycle relative to the first cycle was calculated according to Equation 1. The results are provided in the following Table 2.

Experimental Example 4

Swell Rate Evaluation

The rechargeable lithium battery cells according to Examples 1 to 13 and Comparative Examples 1 to 4 were charged and discharged at 1 C for 300 cycles. The thickness increase as percentage at the $300^{th}$ cycle relative to the first cycle was calculated according to the following Equation 2. The results are provided in the following Table 2. The thicknesses of the cells were obtained by measuring the front and rear sides thereof with a vernier caliper.

$$\text{Thickness increase}(\%) = ((\text{thickness at the } 300^{th}\text{ cycle} - \text{thickness at the } 1^{st}\text{ cycle})/\text{thickness at the } 1^{st}\text{ cycle})*100 \quad [\text{Equation 2}]$$

TABLE 2

| | Capacity (mAh) | Cycle-life efficiency (@$300^{th}$ cycle) | Thickness increase | 45° C. cycle-life efficiency (@ $300^{th}$ cycle) |
|---|---|---|---|---|
| Example 1 | 3824 | 80% | 4.8% | 82% |
| Example 2 | 3871 | 81% | 9.6% | 83% |
| Example 3 | 3874 | 78% | 11.7% | 79% |
| Example 4 | 3850 | 79% | 6.8% | 82% |
| Example 5 | 3860 | 82% | 4.2% | 85% |
| Example 6 | 3875 | 83% | 3.9% | 84% |
| Example 7 | 3870 | 85% | 7.2% | 85% |
| Example 8 | 3870 | 78% | 9.8% | 79% |
| Example 9 | 3735 | 83% | 5.7% | 84% |
| Example 10 | 3881 | 78% | 8.3% | 87% |
| Example 11 | 3802 | 85% | 3.8% | 86% |
| Example 12 | 3865 | 71% | 17.2% | 75% |
| Example 13 | 3852 | 75% | 14.6% | 78% |
| Comparative Example 1 | 3766 | 43% | 10.8% | 68% |
| Comparative Example 2 | 3840 | 65% | 20.1% | 73% |
| Comparative Example 3 | 3776 | 41% | 8.9% | 71% |
| Comparative Example 4 | 3862 | 67% | 22.3% | 75% |

Based on the results provided in Table 2, rechargeable lithium battery cells including an electrolyte including $LiPO_2F_2$ and a sultone-based compound as additives within the above described ratios according to exemplary embodiments of the present invention had improved capacity, improved cycle-life characteristic, and improved high temperature cycle-life characteristic. Accordingly, rechargeable lithium battery cells according to embodiments of the present invention maintained high cycle-life capacity after hundreds of cycles. In addition, the rechargeable lithium battery cells had reduced thickness increase after high temperature cycling and appeared to have less physical deformation.

What is claimed is:

1. A rechargeable lithium battery comprising:
a negative electrode comprising a negative active material;
a positive electrode having an active mass density of 3.6 to 4.0 g/cm$^3$ and comprising a positive active material; and
an electrolyte comprising 0.01 to 15 wt % $LiPO_2F_2$ and 0.5 to 10 wt % of a sultone-based compound based on the total weight of the electrolyte, the sultone-based compound comprising 1,3-propene sultone,
wherein the electrolyte is produced from an electrolyte precursor having a viscosity of 4 cp to 16 cp at 25° C.

2. The rechargeable lithium battery of claim 1, wherein the electrolyte includes $LiPO_2F_2$ at 1 to 10 wt % based on the total weight of the electrolyte.

3. The rechargeable lithium battery of claim 1, wherein the electrolyte includes the sultone-based compound at 0.5 to 3 wt % based on the total weight of the electrolyte.

4. The rechargeable lithium battery of claim 1, wherein the positive active material comprises a lithium cobalt oxide.

5. The rechargeable lithium battery of claim 1, wherein the electrolyte is a gel electrolyte.

6. The rechargeable lithium battery of claim 5, wherein the gel electrolyte comprises a polymer.

7. The rechargeable lithium battery of claim 6, wherein, the electrolyte precursor has a viscosity of 7 to 16 cp at 25° C.

8. The rechargeable lithium battery of claim 1, wherein the electrolyte further comprises a non-aqueous organic solvent and a lithium salt.

9. An electrolyte comprising:
0.01 to 15 wt % $LiPO_2F_2$; and
0.5 to 10 wt % of a sultone-based compound based on the total weight of the electrolyte, the sultone-based compound comprising 1,3-propene sultone;
wherein the electrolyte is produced from an electrolyte precursor having a viscosity of 4 cp to 16 cp at 25° C.

10. The electrolyte of claim 9, wherein the electrolyte is a gel electrolyte.

11. The electrolyte of claim 10, wherein the gel electrolyte comprises a polymer.

* * * * *